March 17, 1964 L. R. GRABOWSKI ETAL 3,124,969

PRELOADED BALL BEARING SCREW ASSEMBLY

Filed Aug. 14, 1961

INVENTORS
Leonard R. Grabowski,
BY &George C. Widmoyer

Bryce Beeler
ATTORNEY

United States Patent Office 3,124,969
Patented Mar. 17, 1964

3,124,969
PRELOADED BALL BEARING SCREW ASSEMBLY
Leonard R. Grabowski, Bay City, and George A. Widmoyer, Reese, Mich., assignors to General Motors Corporation, Detroit, Mich., a corporation of Delaware
Filed Aug. 14, 1961, Ser. No. 131,160
3 Claims. (Cl. 74—441)

This invention relates to devices for translating linear motion into rotary motion or vice versa, and more particularly concerns an improvement in ball bearing screw and nut assemblies.

Such assemblies find wide application in industry. Depending on the particular application, it may be necessary or desirable to employ two nuts in tandem relation on the screw and to place the contained balls under a preload, eliminating lash between the screw and nut. This is often true, for example, when the screw and nut assembly is employed for the precise positioning of a machine part or work-piece.

Heretofore it has been the practice to eliminate the lash by drawing the two ball nuts toward one another while the same are disposed on the screw with a compressible shim therebetween, the required force being applied through hex nuts carried by bolts passing through flanges at the juxtaposed ends of the ball nuts.

The described flanges complicate the manufacture and increase the cost of the ball nuts and in some cases preclude use of the assembly because of clearance limitations. Accordingly, a principal object of the invention is to effect the preloading of the balls without the use of flanges or similar means.

Other objects and features of the invention will be apparent from the following description which will proceed with reference to the accompanying drawings illustrating preferred embodiments of the invention.

Figure 1:
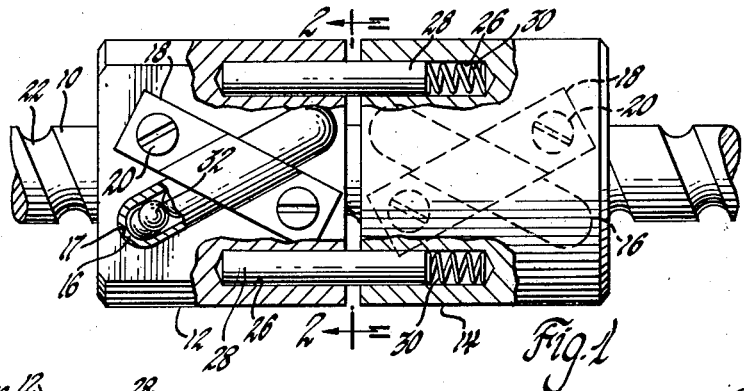
FIGURE 1 is a longitudinal elevation of a ball nut and screw assembly incorporating the invention, both the nut and screw being shown broken away.

Referring first to FIGURE 1, the numeral 10 denotes the screw component of the assembly. Carried thereon in tandem relation are ball nuts 12 and 14 of generally conventional design. Thus the nuts are equipped with return tubes 16 made fast to the nuts by means of clamps 18 secured by screws 20 threaded into the nuts. Tubes 16, the legs of which are accommodated in holes 17 in the bodies of the nuts (FIG. 2), make endless the ball races provided by the groove 22 of the screw and complementary helical grooves 23 formed internally of the nuts.

In use of a device as illustrated, either the screw or the nut assembly may be connected to the power source. Most usually it is the screw which is rotated to cause the nuts to travel lineally thereon, but in some instances the nuts are caused to rotate, while held against axial movement, to bring about lineal travel of the screw.

Figures 1A, 2:
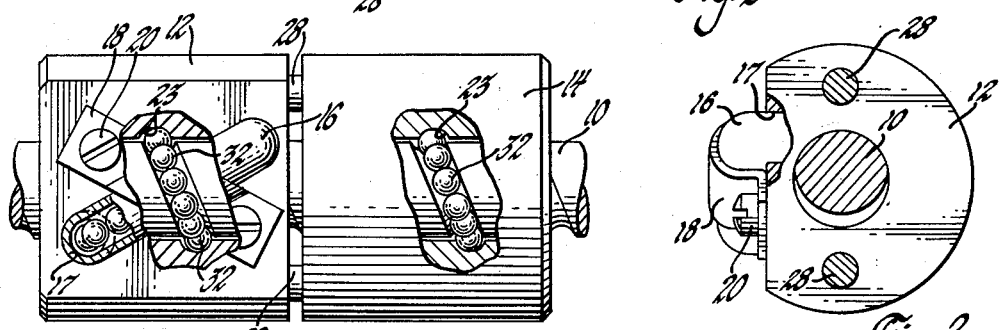
FIGURE 1A is a view provided to illustrate the disposition of the ball elements as preloaded in accordance with the invention.
FIGURE 2 is a view on the line 2—2 in FIGURE 1.

In accordance with the invention, the two nuts are provided with bores 26 for the accommodation of plungers 28 and associated springs 30. Plungers 28 serve to prevent relative rotation of the nuts while springs 30 act to provide the desired preloading of the balls (32) in the aforementioned races. In FIG. 1A, the offset relation of the race grooves and the disposition of the balls is exaggerated to better illustrate the action of the springs in the attainment of the preload. As should be apparent, the degree of the preload is a function of the inherent rate or stiffness of the springs 30 taken with the length of the bore available to the spring.

To assemble the device of FIGURE 1, nut 12, for example, with its return tube 16 not yet installed, is placed on the screw 10 and the internal groove of the nut brought into registry with the screw groove. Thereafter the required number of balls are introduced into the race through the holes 17 in the nut. With this accomplished, the return tube is fixed to the nut and plungers 26 located therein. Nut 14 carrying the springs 30, and with its return tube not yet installed, is then brought into juxtaposed relation to the nut 12, plungers 28 serving as pilots in this connection. Next a clamping tool is applied to urge nut 14 toward nut 12 as necessary to cause registry of the internal groove 23 of the nut 14 and the screw groove. This action, of course, proceeds with compression of the springs 30 and is followed by introduction of the balls into the race between the nut 14 and the screw. Once the charging of the balls to the nut 14 is complete the return tube for such nut is installed and the clamping tool removed. The withdrawal of the clamping tool of itself results in the preloading of the balls.

Figure 3:
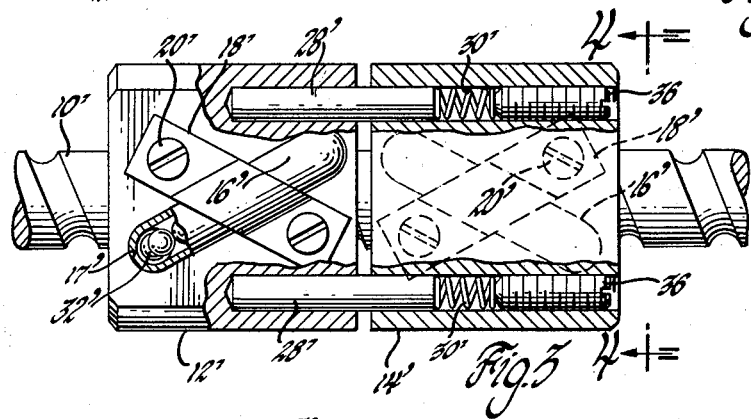
FIGURE 3 is a view similar to FIGURE 1 showing a modification.
Figure 4:
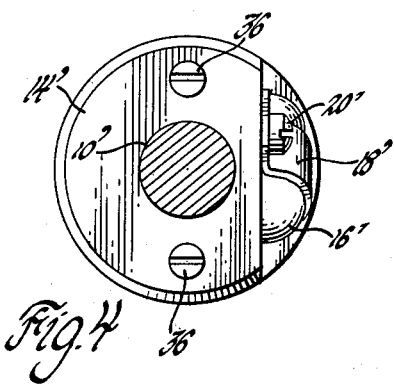
FIGURE 4 is a view on the line 4—4 in FIGURE 3.

In the case of the modification of FIGURES 3 and 4 in which parts similar to those appearing in FIGURE 1 are denoted by like numerals, these numerals, however, being primed, the construction comprises a pair of screws 36 threaded into the body of the nut 14' and seating the outer ends of the springs 30. Here again the plungers 28' take the reaction of the springs and preclude relative rotation of the nuts.

The assembly of the modified design may be carried out as above described except for the final adjustment enabled by the screws 36. It will be understood that these screws are backed off or tightened whichever is necessary to attain the precise preload desired for the particular application contemplated.

What is claimed is:

1. A device for translating linear motion into rotary motion or vice versa comprising a screw component, a pair of nuts carried on said screw component in end-to-end relation each having an internal helical groove formed complementarily to the screw groove to provide ball races, and a train of balls in each such race, said nuts being interconnected via a plurality of plungers located in axially disposed registering blind bores in said nuts, one of said nuts having in each of its bores a spring disposed between the end of the bore and the corresponding plunger, the spring being in a compressed state and operating to preload the balls in said races.

2. A device for translating linear motion into rotary motion or vice versa comprising a screw component, a pair of nuts carried on said screw component in end-to-end relation each having an internal helical groove formed complementarily to the screw groove to provide ball races, a train of balls in each such race, a plurality of plungers located in registering axial bores in said nuts to prevent relative rotation thereof, spring means in each bore of one of said nuts and adjustable means in said last bores to maintain said springs in a state of compression between said adjustable means and the plungers, whereby said balls are held under a predetermined preload.

3. A device as defined by claim 2 where said adjustable means consists of a plurality of screws threaded into said last-mentioned bores.

References Cited in the file of this patent

UNITED STATES PATENTS

| | | |
|---|---|---|
| 2,328,732 | McKinney | Sept. 7, 1943 |
| 2,593,075 | Vale et al. | Apr. 15, 1952 |
| 2,674,899 | Gobereau | Apr. 13, 1954 |
| 2,919,596 | Kuehl | Jan. 5, 1960 |
| 3,025,604 | Shelly | Mar. 20, 1962 |